United States Patent [19]
Tyson, Sr.

[11] Patent Number: 5,056,138
[45] Date of Patent: Oct. 8, 1991

[54] TELEVISION SELECTION SYSTEM
[75] Inventor: Jerroll R. Tyson, Sr., Miami, Fla.
[73] Assignee: Nuphase Electronics, Inc., Miami, Fla.
[21] Appl. No.: 405,125
[22] Filed: Sep. 11, 1989
[51] Int. Cl.[5] .......................... H04N 3/24; H04N 5/46
[52] U.S. Cl. ..................................... 380/10; 358/147; 358/165; 358/189; 455/6
[58] Field of Search ................... 358/33, 143–147, 358/165, 189; 455/6

[56] References Cited
U.S. PATENT DOCUMENTS

| 3,732,365 | 5/1973 | Rando et al. | 358/165 X |
| 3,999,005 | 12/1976 | Dickinson | 380/12 |
| 4,318,125 | 3/1982 | Shutterly | 358/145 X |
| 4,319,277 | 3/1982 | Nicholson et al. | 358/165 |
| 4,554,584 | 11/1985 | Elam et al. | 358/165 |

Primary Examiner—Bernarr E. Gregory
Attorney, Agent, or Firm—Jay M. Cantor

[57] ABSTRACT

A system connectable into standard television receiver systems for converting predetermined channels thereof to audio only channels and detecting selection of the predetermined channels to cause blanking of the picture tube at individual receivers in the system. The antenna or cable input is altered by supplying a carrier with audio, code and horizontal sync information at a frequency corresponding to that of an unused channel. A tone decoder is responsive to the code and horizontal sync information to cause blanking of the display while the audio information is reproduced in normal manner.

17 Claims, 3 Drawing Sheets

TELEVISION SELECTION SYSTEM

BACKGROUND OF THE INVENTION

1. Field of the Invention

This invention relates to a system connectable into standard television receiver systems for converting predetermined channels thereof to audio only channels and detecting selection of the predetermined channels to cause blanking of the picture tube at individual receivers in the system.

2. Brief Description of the Prior Art

In certain types of locations, such as, for example, hotel rooms and the like, it is desirable to provide both radio and television reception for the guests. This type of service has been provided in the past by utilizing individual radio and television instruments. More advanced systems for providing such service with a single unit have been provided as shown, for example, in Nicholson U.S. Pat. No. 4,319,277 and Wheeler U.S. Pat. No. 4,021,849. The Nicholson system, requires that the horizontal sync component be absent. Present day digital scanning receivers require a horizontal sync pulse to sense the presence of a station, thus not allowing the receiver to sense the station presence. Thus Nicholson is not practical for use in conjunction with digital scanning receivers. In Wheeler, blanking of the cathode ray tube is dependent upon an unmodulated picture carrier. The Wheeler circuit requires a major redesign of the television unit for "music only" as obtained by the circuit described hereinbelow. The "music only" switch is an add-on item and requires external power, video sampling from the TV and bias level shift output back to the TV. Wheeler further adds an undesirable feature in that when the picture darkens, the picture tube turns completely black and would therefore return to a bright picture very slowly. These prior art systems have not been versatile in that they cannot be used in conjunction with many present day television systems and are relatively expensive to produce and install.

It is also known that a video black burst generator signal alone will not black out an ordinary television receiver. Preset values of brightness and contrast generally dictate where the level of brightness will be at any given time. Conversely, a high quality studio monitor has d.c. restoration and thus will black out when sent a black burst transmission, however such monitors are very expensive and not generally sold as consumer items. It is therefore apparent that there is a need for a television system which is capable of providing audio to provide, for example, relaxing music, with a totally blackened out picture tube. The system must also be relatively inexpensive and not require monitor facilities and a separate FM radio.

SUMMARY OF THE INVENTION

In accordance with the present invention, the above noted deficiencies of the prior art are minimized and there is provided a relatively inexpensive system which is readily installed into a multi-television receiver antenna system and between the video detector and luminance circuit of each television receiver circuit associated with the antenna system. The system can be so installed in conjunction with substantially any commercial television system in present use.

Briefly, the system includes the provision of a separate R.F. modulator for use in conjunction with each channel to be used for operation other than the standard video, such as for music only. Each modulator is coupled to the antenna or cable input to the television receiving system. The input to each such modulator is a combination of sine wave of predetermined frequency, preferably 20 KHz, in conjunction with the output of a black burst generator as well as the audio program to be reproduced. The modulator input from the black burst generator is a series of lines which corresponds to the horizontal scanning lines or horizontal sync signals of a television receiver with the predetermined frequency superimposed thereon.

When the channel corresponding to the R.F. modulator frequency is selected, the audio from that signal is separated out at the output of the standard I.F. section and sent to the audio circuits to provide an audio output in standard manner. In addition, each television receiver is provided with a tone decoder circuit which samples the output of the system video detector. When the above described output from the R.F. modulator with horizontal sync signals having the 20 KHz signal superimposed thereon is not sensed by the tone decoder at the output of the I.F detector, the system operates as a standard television receiver and transmits both the standard audio and video in standard manner. However, when the channel corresponding to the above noted R.F. modulator frequency is selected, the output of the system video detector will be a plurality of horizontal scanning lines with the predetermined frequency superimposed thereon. This signal is detected by the tone decoder which operates as a switch and, after a predetermined time period corresponding to a predetermined number of horizontal scans, causes the tone decoder to send a blanking signal to the luminance circuit, preferably but not limited to the bias circuit thereof, to cause the luminance to be at a minimum and darken the cathode ray tube. The audio signal which has been provided at the R.F. modulator will be heard through the audio circuits. In this way, either radio or other predetermined audio programs can be provided by selecting the appropriate channel on the television receiver without actuation of the display which, preferably, is in the form of a cathode ray tube. The selected channel is generally a normally unused channel.

DESCRIPTION OF THE PREFERRED EMBODIMENT

Figure 1:
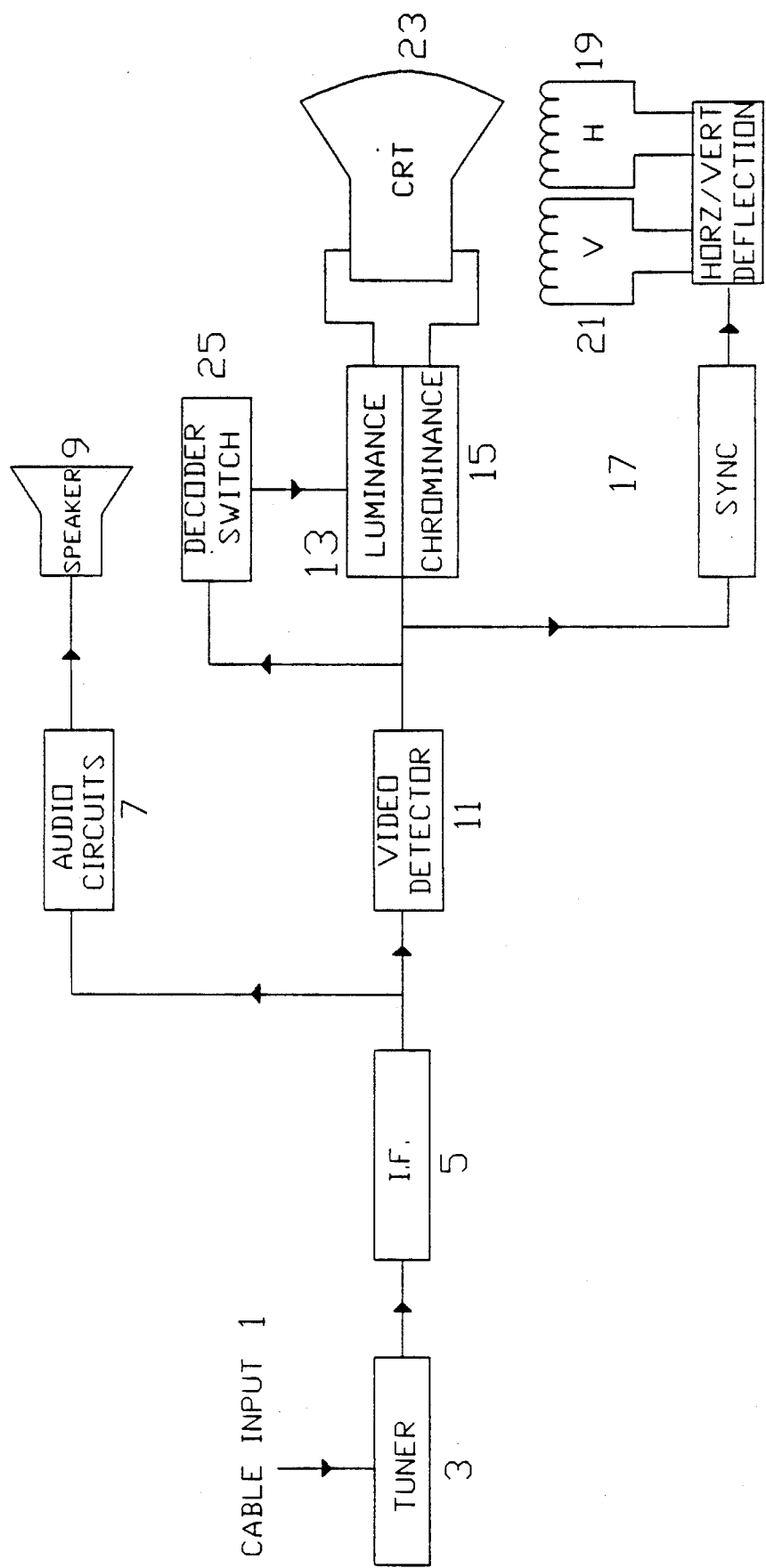
FIG. 1 is a block diagram of a television receiver system in accordance with the present invention.

Referring first to FIG. 1, there is shown a block diagram of a television receiver system in accordance with the present invention. The system includes an input 1 which can be from an antenna or cable, cable being shown. This input is fed to the standard tuner 3, the output of which is fed to a standard I.F. (intermediate frequency) circuit 5. The I.F. circuit output is separated to provide a signal for audio circuits 7 and a speaker 9 connected thereto as well as a signal for the video detector 11. The output of the video detector is sent to a luminance circuit 13, a chrominance circuit 15 and the sync (synchronizing) circuit 17. The sync circuit controls the horizontal and vertical deflection coils 19 and 21 of the display 23, preferably a cathode ray tube. The luminance and chrominance of the display are controlled by the luminance and chrominance circuits 13 and 15 respectively. The above described circuits comprise the standard color television receiver. Accordingly, no further discussion of the specific circuits or their operation is required since all of the circuits, in some form, and their operation are well known in the art.

Also shown in FIG. 1 is a tone decoder circuit 25 which is coupled between the output of the video detector 11 and the luminance circuit 13. It is the purpose of the tone decoder circuit 25 to monitor the output of the video detector 11 and provide a signal (as will be explained hereinbelow) to the luminance circuit 13, preferably to the bias circuit thereof, which will turn off or substantially reduce the luminance of the display 23 when a predetermined signal is sensed at the output of the video detector over a predetermined number of horizontal scans and as long as such predetermined signal continues to be sensed by the tone decoder circuit.

Figure 2:
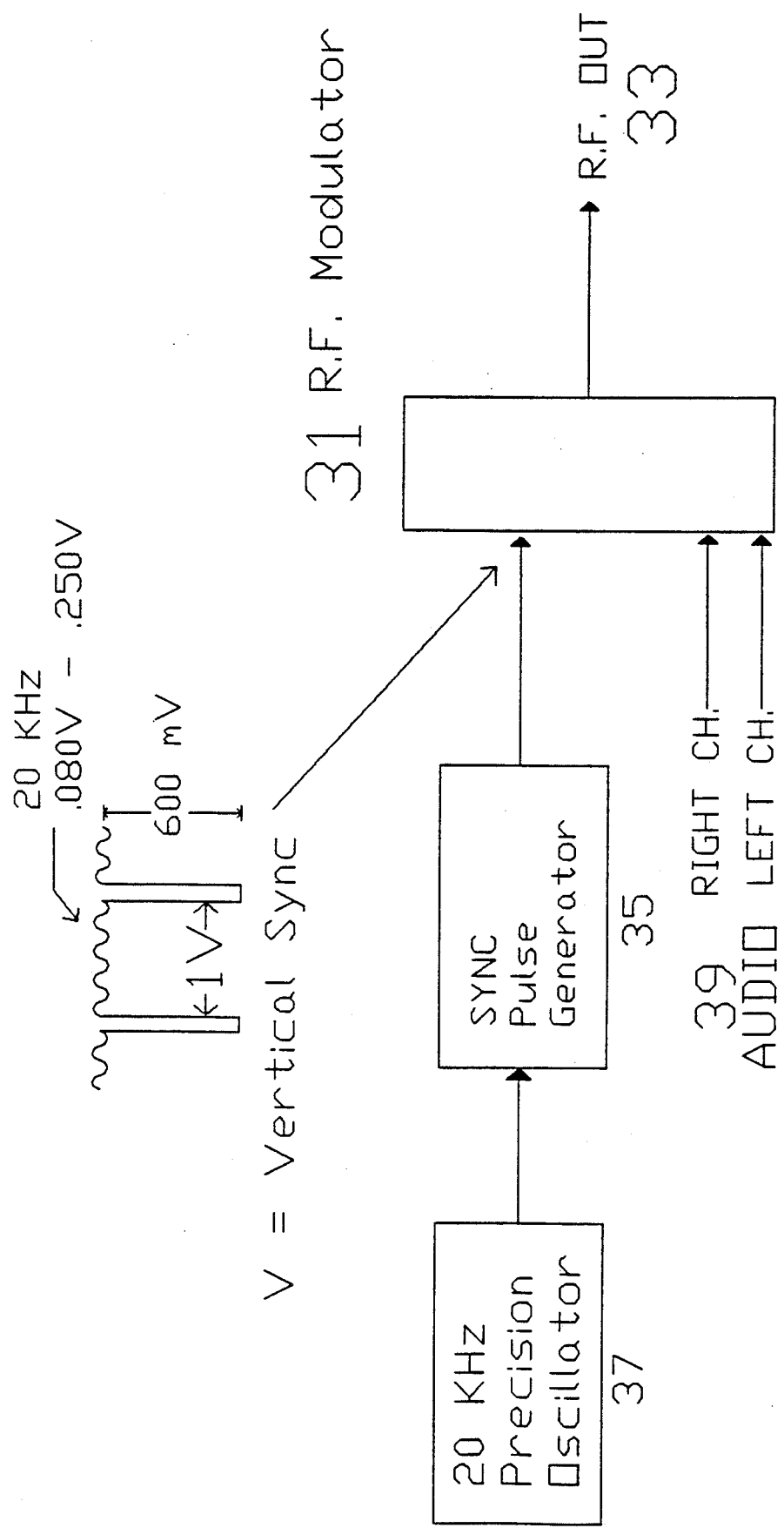
FIG. 2 is a block diagram of an input to the antenna or cable system for a single audio channel in accordance with the present invention.

Referring now to FIG. 2, there is shown an input circuit to the television antenna or cable system for a single audio program in accordance with the present invention, it being understood that plural such input circuits can be provided, each such input circuit being associated with a different channel, preferably an unused channel.

There is shown a standard R.F. (radio frequency) modulator 31 having an R.F. output 33 therefrom which feeds the antenna or cable input 1 to the system as shown in FIG. 1. A black burst generator 35 of standard type which provides horizontal deflection or horizontal sync signals provides an input to the R.F. modulator 31, these signals having an override of a predetermined frequency which is constantly applied thereto and superimposed thereon. A 20 KHz precision oscillator 37 is shown providing such predetermined frequency signal, preferably having a voltage in the range of about 80 to 100 millivolts. Accordingly, the predetermined frequency is applied to the horizontal deflection signal during each scanning line. Also applied to the R.F. modulator 31 is an audio input signal 39 which can be applied as a stereo or monaural signal. The R.F. output 33 is a combination of the modulated black burst generator output with 20 KHz signal superimposed thereon and the audio input. It is the modulated output of the black burst generator 35 which, when sensed by the tone decoder 25 of FIG. 1, triggers the tone decoder to provide an appropriate signal to the luminance circuit 13 to shut off or darken the display 23 while the audio on the selected channel continues to be picked up by the audio circuits at the output of the I.F. circuit 5 and is converted to sound by the speaker 9.

Figure 3:
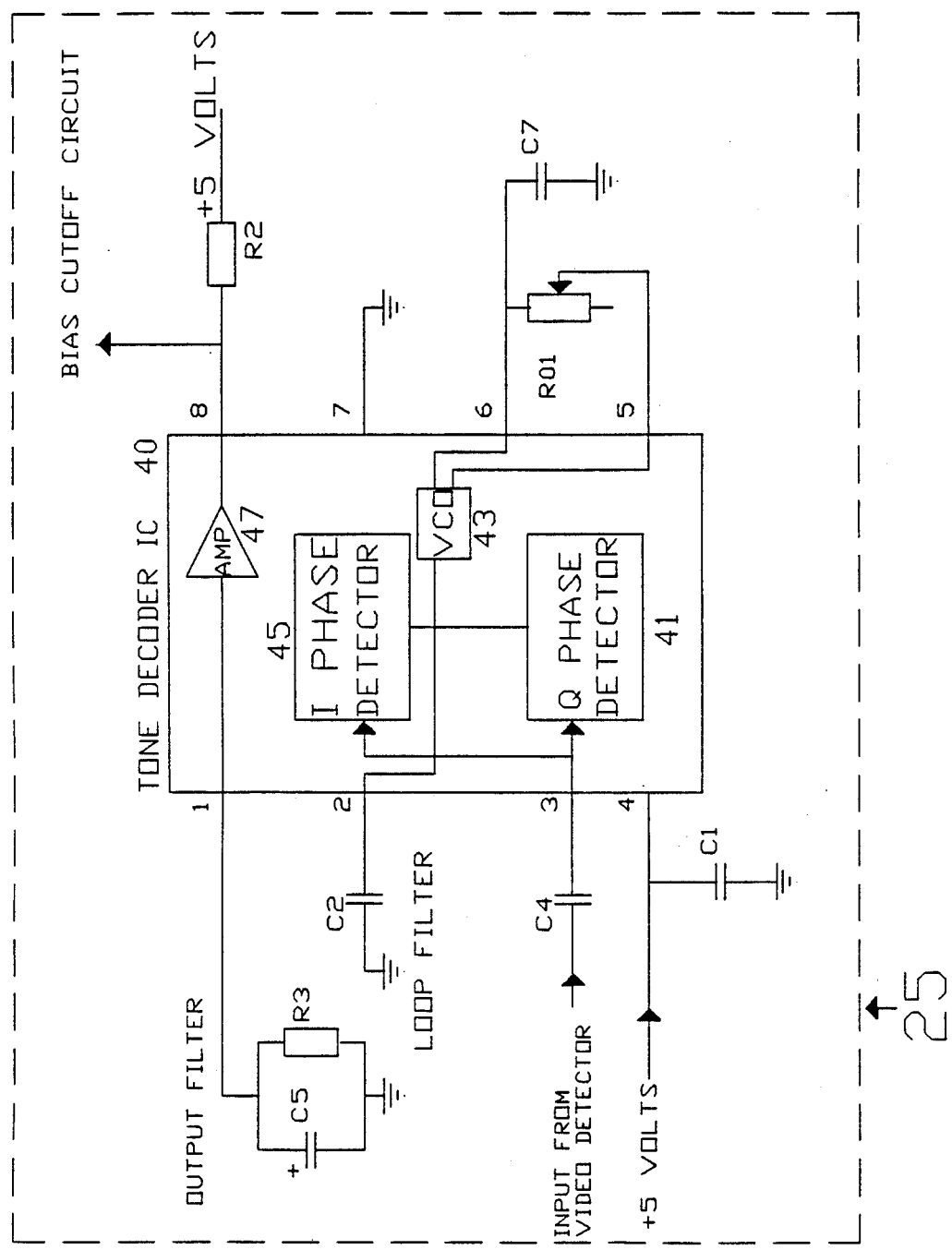
FIG. 3 is a circuit diagram of the tone decoder of FIG. 1.

Referring now to FIG. 3, there is shown a circuit diagram of the tone decoder 25 of FIG. 1. The circuit is in the form of an integrated circuit 40 having thereon a Q phase detector 41 coupled to the input at pin 3. The output of the Q phase detector 41 along with the output of a voltage controlled oscillator 43 as sent to the input of an I phase detector 45, the output of the I phase detector being sent to the input of an amplifier 47. The circuit composed of the I phase detector 45 and Q phase detector 41 driven by the voltage controlled oscillator 43 determines the center frequency of the tone decoder 25. As noted hereinbelow, external components are also used to independently set center frequency, band width and output delay.

The output of the amplifier 47 at pin 8 is coupled to the luminance circuit 13, preferably the bias circuit thereof, to shut off or darken the display 23. The integrated circuit 40 of FIG. 3 requires an external 5 volt supply at pin 4 thereof with a filter capacitor C01 coupled therefrom to ground. The pins 5 and 6 are coupled to the voltage controlled oscillator as well as to an RC circuit composed of variable resistor R01 and capacitor C07 which determines the frequency of the voltage controlled oscillator, adjustment being made by adjusting the setting of the variable resistor as is well known. Capacitor C02 is coupled to the input of the I phase detector via pin 2 and acts as a loop filter. Capacitor C02 is selected to provide a band width of about 500 cycles on each side of the center frequency. The RC circuit composed of resistor R03 and capacitor C05 is coupled to pin 1 and acts as an output filter and also determines the length of time that the "music only" signal composed of the horizontal sync signal with 20 KHz signal superimposed thereon must be sensed (generally about one second) before the blanking of the display device 23 takes place. This is to avoid the possibility of blanking taking place in response to a spurious or transient signal present at the video detector.

The input to the tone decoder circuit at pin 3 enters through input capacitor C04. The input impedance is about 20K ohms sa as not to affect the video information. The output from the tone decoder circuit is taken at pin 8, this pin also being coupled to a 5 volt source through a pull up resistor R02. The integrated circuit ground is applied at pin 7 thereof.

In operation, the antenna or cable system utilized for simultaneously providing signals to a plurality of television receivers, such as in a hotel, is altered as shown in FIG. 2 by providing an input to the antenna or cable 1 (FIG. 1) via an R.F. modulator 31 connected thereto. This alteration requires utilization of a separate modulator for each channel to be altered.

An unused channel is selected with the R.F. modulator providing the carrier signal corresponding to the frequency of the selected unused channel. The audio program signals 39 are applied to the R.F. modulator 31 along with the black burst generator signal 35 with 20 KHz signal 37 superimposed thereon. The R.F. output 33 from the R.F. modulator 31 is accordingly the carrier signal with the audio information, the black burst generator 35 signal providing horizontal scanning information and the 20 KHz. trigger signal 37 for triggering the tone decoder. When this R.F. output reaches the individual television receiver and the unused channel has been selected, the audio information will be separated out at the output of the I.F. stage 5 (FIG. 1) and sent to the audio circuits 7 and speaker 9 for audio reproduction in standard manner. However, the output of the black burst generator 35 with 20 KHz tone 37 thereon (music only signal) will be sensed by the tone decoder 25 and recognized as the code to cause blanking of the display. When the "music only" signal has been sensed repeatedly without interruption by the tone decoder 25 for the predetermined time period as determined by the output filter composed of resistor R03 and capacitor C05, the tone decoder circuit will control a portion of the luminance circuit 13 to blank or severely restrict the luminance of the display 23, such as, for example, by controlling the bias circuit for the display device. The "music only" signal must continue to be transmitted uninterrupted after blanking of the display takes place in order for the tone decoder 25 to continue to provide the blanking or switching action above described. In this manner, a separate audio program is selectably received at the individual television receiver in the system with blanking of the display.

It is, of course, apparent that plural different audio programs can be made available by utilizing a separate R.F. modulator circuit as shown in FIG. 2 for each different program with selection of a different R.F. carrier frequency to match that of a different unused channel.

It follows that there has been provided a "music only" system which can be installed into any existing television set relatively inexpensively. The system is capable of operation with existing NTSC, PAL or SECAM standards and cannot be falsely triggered by standard video transmissions. The system does not interfere with the standard video signal and blacks out the picture tube on encrypted channels only. No separate tuner or radio circuit is required after the audio input to the R.F. modulator.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A television circuit for receiving information at plural predetermined channel frequencies, comprising:
   (a) display means;
   (b) luminance control means to normally control the luminance of said display means;
   (c) modulator means associated with predetermined ones of said channel frequencies for providing a predetermined encoded signal responsive to selection of one of said predetermined ones of said channel frequencies; and
   (d) decoder means responsive to a said predetermined encoded signal to cause said luminance means to blank said display means.

2. A television circuit as set forth in claim 1, further including means to transmit said decoded signal and an audio signal; means to separate said decoded signal from said audio signal and means responsive to said audio signal to produce audio corresponding to said audio signal.

3. A television circuit comprising:
   (a) display means;
   (b) luminance control means to normally control the luminance of said display means;
   (c) means responsive to a predetermined encoded signal to cause said luminance means to blank said display means;
   (d) means to receive said encoded signal and an audio signal;
   (e) means to separate said encoded signal from said audio signal;
   (f) means responsive to said audio signal to produce audio corresponding to said audio signal; and
   (g) means to provide said encoded signal and said audio signal comprising a black burst generator for producing horizontal sync signals, an oscillator for superimposing a sinusoidal signal of predetermined frequency on said horizontal sync signals, a source of audio signals and an R.F. modulator responsive to said audio signals and said horizontal sync signals with predetermined frequency superimposed thereon to provide an output containing said signals.

4. A television circuit for receiving audio and video information at plural predetermined channel frequencies, comprising:
   (a) display means responsive to said video information;
   (b) intensity control means normally controlling the intensity of the display on said display means;
   (c) means to generate a composite signal consisting essentially of audio signals and predetermined encoded signals;
   (d) means responsive to said encoded signals to cause said intensity control means to blank said display means; and
   (e) means to separate said audio signals from said encrypted signals.

5. A television circuit as set forth in claim 4 further including means responsive to said audio signals to provide audible sounds corresponding to said audio signals.

6. A television circuit for receiving information at plural predetermined channel frequencies, comprising:
   (a) display means;
   (b) intensity control means normally controlling the intensity of the display on said display means;
   (c) means to generate a composite signal consisting essentially of audio signals and predetermined encoded signals; and
   (d) means responsive to said encoded signals to cause said intensity control means to blank said display means;
   (e) means responsive to said audio signals to provide audible sounds corresponding to said audio signals.

7. A television circuit comprising:
   (a) display means;
   (b) luminance control means to normally control the luminance of said display means; and
   (c) means responsive to a predetermined encoded signal to cause said luminance means to blank said display means;
   (d) wherein said predetermined encoded signal comprises a predetermined plurality of horizontal sync signals having a predetermined signal superimposed thereon.

8. A television circuit as set forth in claim 7 wherein said means responsive to an encoded signal includes means to inhibit said means responsive from causing said luminance means to blank said display means for a predetermined time.

9. A television circuit as set forth in claim 7, further including means to transmit said encoded signal and an audio signal; means to separate said encoded signal from said audio signal and means responsive to said audio signal to produce audio corresponding to said audio signal.

10. A television circuit as set forth in claim 9 further including means to provide said encoded signal and said audio signal comprising a black burst generator for producing horizontal sync signals, an oscillator for superimposing a sinusoidal signal of predetermined frequency on said horizontal sync signals, a source of audio signals and an R.F. modulator responsive to said audio signals and said horizontal sync signals with predetermined frequency superimposed thereon to provide an output containing said signals.

11. A television circuit comprising:
   (a) display means;
   (b) luminance control means to normally control the luminance of said display means; and
   (c) decoder means responsive to a predetermined encoded signal to cause said luminance means to blank said display means;
   (d) wherein said means responsive to a predetermined encoded signal includes means to inhibit said means responsive from causing said luminance means to blank said display means for a predetermined time.

12. A television circuit as set forth in claim 11 further including means to provide said encoded signal and said audio signal comprising a black burst generator for producing horizontal sync signals, an oscillator for superimposing a sinusoidal signal of predetermined frequency on said horizontal sync signals, a source of audio signals and an R.F. modulator responsive to said audio signals and said horizontal sync signals with predetermined frequency superimposed thereon to provide an output containing said signals.

13. A television circuit for receiving information at plural predetermined channel frequencies, comprising:
   (a) display means;
   (b) intensity control means normally controlling the intensity of the display on said display means;
   (c) means to generate a composite signal consisting essentially of audio signals and predetermined encoded signals; and
   (d) means responsive to said encoded signals to cause said intensity control means to blank said display means;
   (e) wherein said means responsive to an encrypted signal includes means to inhibit said means responsive from causing said luminance means to blank said display means for a predetermined time.

14. A television circuit as set forth in claim 13, further including means to separate said audio signals from said encoded signals and further including means responsive to said audio signals to provide audible sounds corresponding to said audio signals.

15. A television circuit comprising:
   (a) display means;
   (b) intensity control means normally controlling the intensity of the display on said display means;
   (c) means to generate a composite signal audio signals and predetermined encoded signals; and
   (d) means responsive to said encoded signals to cause said intensity control means to blank said display means;
   (e) wherein said predetermined encoded signal comprises a predetermined plurality of horizontal sync signals having a predetermined signal superimposed thereon;
   (f) further including means to separate said audio signals from said encoded signals
   (g) further including means responsive to said audio signals to provide audible sounds corresponding to said audio signals.

16. A television circuit as set forth in claim 15 wherein said means responsive to an encoded signal includes means to inhibit said means responsive from causing said luminance means to blank said display means for a predetermined time.

17. A television circuit providing a combined signal consisting essentially of an encoded signal and an audio signal comprising:
   (a) display means;
   (b) luminance control means to normally control the luminance of said display means;
   (c) means responsive to a predetermined encoded signal to cause said luminance means to blank said display means;
   (d) means to receive a combined signal consisting essentially of said encoded signal and an audio signal;
   (e) means to separate said encoded signal from said audio signal; and
   (f) means responsive to said audio signal to produce audio corresponding to said audio signal.

* * * * *